(12) United States Patent
Lee et al.

(10) Patent No.: US 10,250,117 B2
(45) Date of Patent: Apr. 2, 2019

(54) APPARATUS FOR CONTROLLING CONVERTER

(71) Applicants: HYUNDAI MOTOR COMPANY, Seoul (KR); KIA MOTORS CORPORATION, Seoul (KR)

(72) Inventors: Youn Sik Lee, Suwon-si (KR); Dae Woo Lee, Incheon (KR); Tae Jong Ha, Seoul (KR); In Yong Yeo, Bucheon-si (KR); Byeong Seob Song, Yongin-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/795,685

(22) Filed: Oct. 27, 2017

(65) Prior Publication Data
US 2018/0166982 A1 Jun. 14, 2018

(30) Foreign Application Priority Data
Dec. 14, 2016 (KR) .................. 10-2016-0170860

(51) Int. Cl.
| H02M 1/08 | (2006.01) |
| H02J 7/02 | (2016.01) |
| H02M 1/00 | (2006.01) |
| H02M 3/335 | (2006.01) |

(52) U.S. Cl.
CPC ............ *H02M 1/08* (2013.01); *H02J 7/02* (2013.01); *H02M 3/335* (2013.01); *H02M 2001/0009* (2013.01); *H02M 2001/0019* (2013.01); *H02M 2001/0048* (2013.01)

(58) Field of Classification Search
CPC . H02M 2001/0009; H02M 2001/0032; H02M 2001/0019; H02M 3/335; H02M 2001/0048; H02J 7/02
See application file for complete search history.

(56) References Cited

U.S. PATENT DOCUMENTS

| 9,800,239 B2* | 10/2017 | Hayashiguchi | .... H03K 17/6872 |
| 2013/0265684 A1* | 10/2013 | Fujikawa | ................. H02H 3/08 361/87 |
| 2014/0055190 A1* | 2/2014 | Kaneko | ................... H02M 1/08 327/376 |
| 2014/0111171 A1* | 4/2014 | Kosugi | ................... H02M 1/08 323/271 |
| 2016/0099665 A1* | 4/2016 | Chen | ...................... H02M 1/08 318/400.27 |

(Continued)

FOREIGN PATENT DOCUMENTS

| KR | 10-2007-0054125 | 5/2007 |
| KR | 10-1500201 | 3/2015 |

*Primary Examiner* — Kyle J Moody
(74) *Attorney, Agent, or Firm* — Brinks Gilson & Lione

(57) ABSTRACT

The present disclosure provides a converter controlling apparatus including a plurality of switching devices capable of controlling a pulse width modulation (PWM), the converter controlling apparatus including: an efficiency determiner configured to variably change resistance of a gate terminal, wherein a PWM signal for controlling the PWM of the switching device is applied to a gate terminal based on an amount of current flowing through the converter.

12 Claims, 6 Drawing Sheets

(56) References Cited

U.S. PATENT DOCUMENTS

2016/0112043 A1\* 4/2016 Hayashiguchi .. H03K 17/08122
                                                327/109
2017/0040802 A1\* 2/2017 Hopperdietzel ..... G01R 15/183
2018/0054117 A1\* 2/2018 Nakamura ............ H02M 3/158

\* cited by examiner

APPARATUS FOR CONTROLLING CONVERTER

CROSS-REFERENCE TO RELATED APPLICATION

The present application claims priority to and the benefit of Korean Patent Application No. 10-2016-0170860, filed on Dec. 14, 2016, which is incorporated herein by reference in its entirety.

FIELD

The present disclosure relates to a converter controlling apparatus, and more particularly, to a converter controlling apparatus for enhancing converter efficiency.

BACKGROUND

The statements in this section merely provide background information related to the present disclosure and may not constitute prior art.

An eco-friendly vehicle such as an electric vehicle, a hybrid vehicle, a plug-in hybrid vehicle, and a fuel cell vehicle is driven using electric energy stored in a high-voltage main battery. The eco-friendly vehicle includes a low-voltage DC-DC converter (LDC) for converting high-voltage power output from a main battery into a low voltage in order to supply a power voltage to a low-voltage electric load driven with a low voltage.

In general, an LDC uses a field effect transistor (FET) as a switching device, on/off of which is controlled by PWM. In this regard, as gate resistance of an FET to which a PWM signal for controlling on/off of the FET is applied is reduced, switching loss is reduced. A method of reducing gate resistance of FET based on this characteristic is one method for enhancing efficiency of an LDC.

However, the method of reducing gate resistance has caused such that an LDC has difficulty in operating as a heavy load. This is because, when a small-size gate resistor is used, a voltage between a drain and a source of an FET is increased toward a high load and, accordingly, the FET may be damaged.

When a size of gate resistance is set during LDC design, an efficiency curve according to load may not be changed during driving. That is, a conventional LDC has a difficulty in reflecting an efficiency curve optimized according to a driver load pattern.

SUMMARY

The present disclosure provides a converter controlling apparatus for enhancing converter efficiency by varying gate resistance of a switching device in a converter according to an amount of load.

In some aspects of the present disclosure, a converter controlling apparatus including a plurality of switching devices that are pulse width modulation (PWM)-controlled, the converter controlling apparatus includes an efficiency determiner configured to variably change resistance of a gate terminal to which a PWM signal for PWM control of the switching device is applied based on an amount of current of the converter.

The efficiency determiner may include a load amount determiner configured to detect the amount of the current flowing through the converter, to compare the amount of the current flowing through the converter with a preset reference value, and to determine whether of the amount of load of the converter is a heavy load or a light load, and a gate resistance setting unit configured to increase resistance of the gate terminal when the amount of load determined by the load amount determiner is the heavy load and to reduce the resistance of the gate terminal when the amount of load determined by the load amount determiner is the light load.

The load amount determiner may include a current transformer configured to output current corresponding to the amount of the current flowing through the converter, resistors configured to generate a detection voltage corresponding to an amount of the output current of the current transformer, and a comparator configured to output a comparison result between the detection voltage and the preset reference voltage.

The gate resistance setting unit may include a first resistor with an end connected to the gate terminal and a second resistor and a switch that are connected in series, a series connection structure between the second resistor and the switch is connected in parallel to the first resistor, the PWM signal is input to the other end of the first resistor, and short and open states of the switch are determined according to a determination result of the heavy load and the light load by the load amount determiner.

The switch may be opened when the amount of load determined by the load amount determiner is the heavy load and may be short-circuited when the amount of load determined by the load amount determiner is the light load.

The switch may be a p-MOSFET, a drain and a source of which are connected to the first resistor and the second resistor, respectively, and the gate resistance setting unit may include a first transistor including a collector connected to a gate of the p-MOSFET and an emitter with a negative voltage value applied thereto, and a second transistor including a collector connected to a base of the first transistor, an emitter that is grounded, and a base to which output of the load amount determiner is applied.

The converter controlling apparatus may further include a controller configured to control the efficiency determiner to repeatedly change the resistance of the gate terminal at a predetermined period irrespective of the amount of the current flowing through the converter.

The converter controlling apparatus may further include a controller configured to control the switch to be repeatedly short-circuited/opened at a predetermined period irrespective of the amount of the current flowing through the converter.

In another aspect of the present disclosure, a converter controlling apparatus including a plurality of switching devices including a gate terminal to which a pulse width modulation (PWM) for PWM control is applied, the converter controlling apparatus includes a load amount determiner including a current transformer configured to output current corresponding to the amount of the current flowing through the converter, a resistor configured to generate a detection voltage corresponding to an amount of the output current of the current transformer, and a comparator configured to output a comparison result between the detection voltage and a preset reference voltage, and a first resistor with one end connected to the gate terminal and a second resistor and a switch that are connected in series, wherein a series connection structure between the second resistor and the switch may be connected in parallel to the first resistor, the PWM signal may be input to the other end of the first resistor, and short and open states of the switch may be determined according to output of the comparator.

The comparator may output a first determination signal when the detection voltage is greater than the reference value and outputs a second determination signal when the detection voltage is less than the reference value, and the switch may be opened when the comparator outputs the first determination signal and may be short-circuited when the comparator outputs the second determination signal.

The switch may be a p-MOSFET, a drain and a source of which are connected to the first resistor and the second resistor, respectively, and the gate resistance setting unit may include a first transistor including a collector connected to a gate of the p-MOSFET and an emitter with a negative voltage value applied thereto, and a second transistor including a collector connected to a base of the first transistor, an emitter that is grounded, and a base to which the first determination signal and the second determination signal are applied.

In another aspect of the present disclosure, a converter controlling apparatus including a plurality of switching devices including a gate terminal to which a pulse width modulation (PWM) for PWM control is applied, the converter controlling apparatus includes a gate resistance setting unit including a first resistor with one end connected to the gate terminal and the other end to which the PWM signal is input, and a second resistor and a switch that are connected in series, wherein a series connection structure between the second resistor and the switch is connected in parallel to the first resistor and the PWM signal is input to the other end of the first resistor, and a controller configured to control the switch to be repeatedly short-circuited/opened at a predetermined period.

The switch may be a p-MOSFET, a drain and a source of which are connected to the first resistor and the second resistor, respectively, and the gate resistance setting unit may include a first transistor including a collector connected to a gate of the p-MOSFET and an emitter with a negative voltage value applied thereto, and a second transistor including a collector connected to a base of the first transistor, an emitter that is grounded, and a base to which a control signal of the controller is input.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
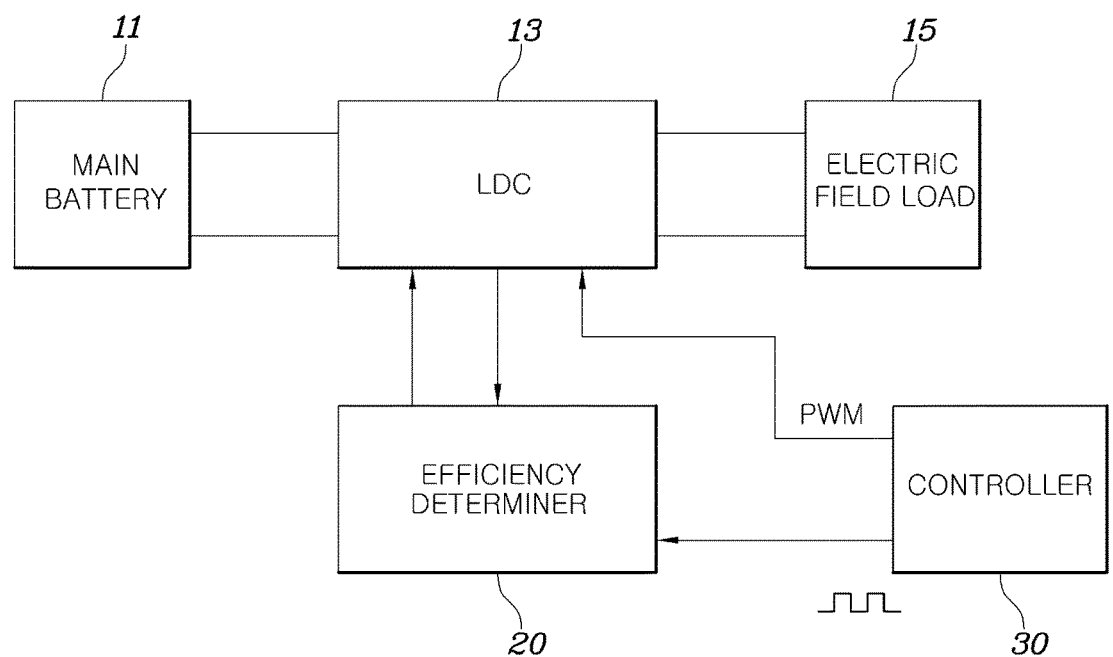
FIG. 1 is a schematic block diagram of a converter controlling apparatus and a vehicle system including the same.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

FIG. 1 is a schematic block diagram of a converter controlling apparatus and a vehicle system including the same in some forms of the present disclosure.

Referring to FIG. 1, the vehicle system including the converter controlling apparatus in some forms of the present disclosure may include a main battery 11 with high-voltage output, a low-voltage DC-DC converter (LDC) 13 for converting a high voltage of the main battery 11 into a low voltage, and an electric field load 15 operated with low-voltage power converted by the LDC 13.

In general, an eco-friendly vehicle that generates driving force through a motor driven by electric energy may include the main battery 11 for driving the motor and supplying high-voltage power to a high-voltage electric field load, and the LDC 13 for converting a voltage of the main battery 11 into a low voltage in order to supply power to the low-voltage electric field load 15 operated with low-voltage power. Although not illustrated, the eco-friendly vehicle may include an auxiliary battery as another component for supplying power to the low-voltage electric field load 15, and the auxiliary battery may store electric energy to be provided to the low-voltage electric field load 15 while voltage conversion is not achieved by the LDC 13, may receive power that is converted and output by the LDC 13, and may be recharged with the power.

The converter controlling apparatus applied to an electrical system of the eco-friendly vehicle in some forms of the present disclosure may include an efficiency determiner 20 for variable control of resistance of a gate terminal of a switching device included in the LDC 13 based on current flowing through the LDC 13. The efficiency determiner 20 may vary the resistance of the gate terminal of the switching device included in the LDC 13 and change an efficiency curve that is applied according to a load state of the LDC 13, thereby enhancing efficiency of the LDC 13 in a wide dynamic range.

Figure 2:
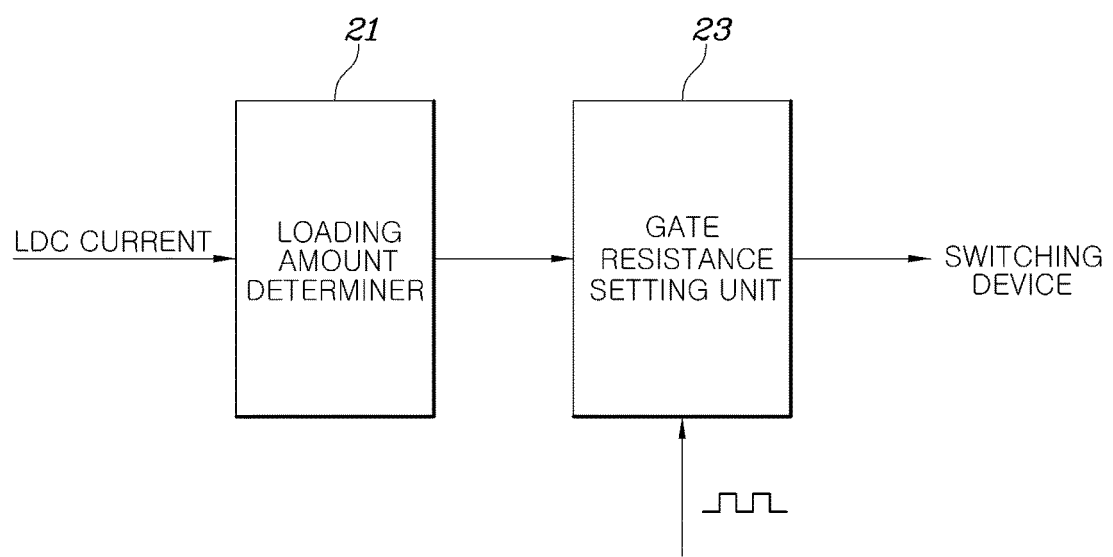
FIG. 2 is a block diagram illustrating an efficiency determiner of a converter controlling apparatus.

FIG. 2 is a block diagram illustrating the efficiency determiner 20 of a converter controlling apparatus in some forms of the present disclosure.

Referring to FIG. 2, the efficiency determiner 20 of the converter controlling apparatus in some forms of the present disclosure may include a load amount determiner 21 that detects an amount of current flowing through a converter, compares the current amount of the converter with a preset reference value, and determines whether an amount of load of the converter is a heavy load or a light load, and a gate resistance setting unit 23 that increases resistance of the gate terminal of the switching device in the LDC 13 when the amount of load determined by the load amount determiner 21 is the heavy load and reduces the resistance of the gate terminal of the switching device in the LDC 13 when the amount of load determined by the load amount determiner 21 is the light load.

The efficiency determiner included in the converter controlling apparatus in some forms of the present disclosure may determine whether the load of the LDC 13 is a heavy load or a light load based on the current amount of the LDC 13 using the load amount determiner 21. The LDC 13 may include the switching device that is turned on/off according to a pulse width modulation (PWM) signal as a pulse signal with a duty determined by a controller 30 to be PWM-controlled and the duty of the PWM signal may be determined by the controller 30 according to a load state of the LDC 13. That is, the controller 30 may control the duty of the PWM signal according to power required by the electric field load 15 that receives a power voltage from the LDC 13 to determine current flowing through the LDC 13 and, in this regard, the current amount of the LDC 13 may be increased in a heavy load state in which the electric field load 15 requires a large amount of power and may be reduced in a light load state in which the electric field load 15 requires a small amount of power.

Accordingly, the load amount determiner 21 may detect the current flowing through the LDC 13 to determine a load state of the LDC 13.

In the efficiency determiner included in the converter controlling apparatus in some forms of the present disclosure, the gate resistance setting unit 23 may determine the resistance of the gate terminal of the switching device in the LDC according to the load state of the LDC 13 determined by the load amount determiner 21. When the amount of load determined by the load amount determiner 21 corresponds to a light load, the gate resistance setting unit 23 may reduce the resistance of the gate terminal of the switching device in the LDC 13 to enhance turn-on speed of the switching device, thereby enhancing the efficiency of the LDC 13 in the case of the light load. In addition, when the amount of load determined by the load amount determiner 21 corresponds to a heavy load, the gate resistance setting unit 23 may increase the resistance of the gate terminal of the switching device in the LDC 13 to reduce voltage stress of the switching device, thereby inhibiting the switching device from being damaged and enabling a stable operation.

Figure 3:
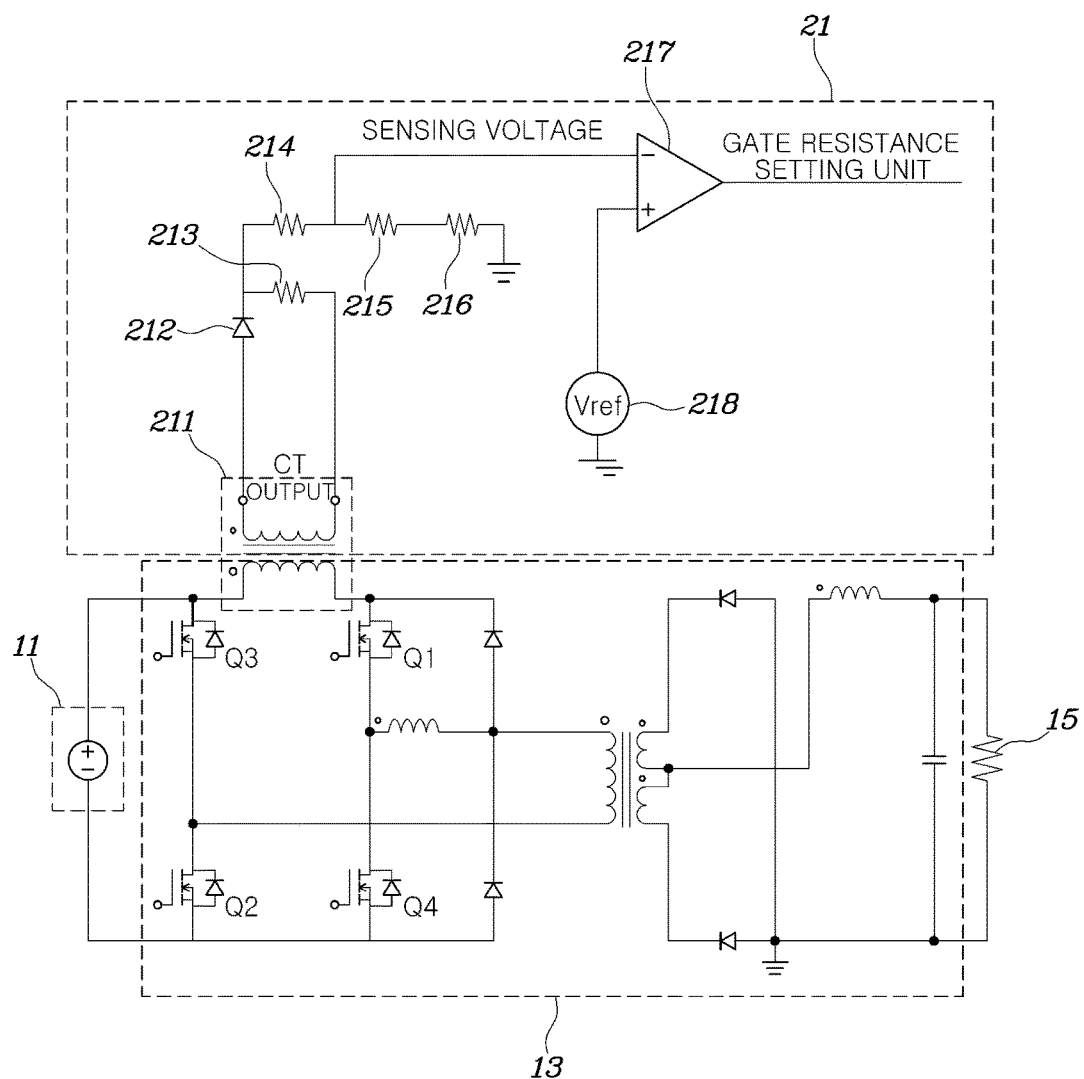
FIG. 3 is a detailed circuit diagram of a load amount determiner in an efficiency determiner of a converter controlling apparatus and a circuit diagram of a connection relationship between a converter and the load amount determiner.

FIG. 3 is a detailed circuit diagram of the load amount determiner 21 in an efficiency determiner of a converter controlling apparatus and a circuit diagram of a connection relationship between a converter and the load amount determiner 21 in some forms of the present disclosure.

Referring to FIG. 3, the load amount determiner 21 may include a current transformer 211 for detecting current flowing through the LDC 13, resistors 213 to 216 for generating a detection voltage corresponding to the current amount detected by the current transformer 211, and a comparator 217 for outputting a comparison result of the detection voltage of the resistors 213 to 216 and a preset reference voltage Vref.

The current transformer 211 may be used to detect current that flows in the LDC 13 and, although FIG. 3 illustrates the case in which the current transformer 211 is disposed between two switching devices Q1 and Q3 of the LDC 13, the current transformer 211 may be disposed and installed at various locations. The current transformer 211 may output induced current induced by the current flowing through the LDC 13. That is, the current transformer 211 may output current corresponding to the amount of the current that flows in the LDC 13.

Current output from the current transformer 211 may be converted into a voltage by the resistors 213 to 216. That is, a voltage that is proportional to current output by the current transformer 211 may be applied to the resistors 213 to 216. The number of the resistors 213 to 216 may be appropriately adjusted as necessary and a voltage divided from one end of any one of the resistors 213 to 216 may be input to the comparator 217.

The comparator 217 may compare the detection voltage applied to the resistors 213 to 216 and the preset reference voltage Vref and output the comparison result. For example, when the detection voltage applied to the resistors 213 to 216 is smaller than the reference voltage Vref, a voltage signal with a value corresponding to High may be output and, when the detection voltage applied to the resistors 213 to 216 is greater than the reference voltage Vref, a signal corresponding to Low may be output. That is, the case in which the detection voltage is greater than the reference voltage Vref is a state in which a large amount of current flows in the LDC 13 and, thus, when the comparator 217 outputs Low, the current state may be determined to be a heavy load state. In addition, the case in which the detection voltage is smaller than the reference voltage Vref is a state in which a small amount of current flows in the LDC 13 and, thus, when the comparator 217 outputs High, the current state may be determined to be a light load state.

The LDC 13 may be embodied as an insulation type converter including switching devices Q1 to Q4 and an electric transformer Tr and the switching devices Q1 and Q2 and the switching devices Q3 and Q4 may be PWM-controlled to be opened/short-circuited in complementary relations.

Figure 4:
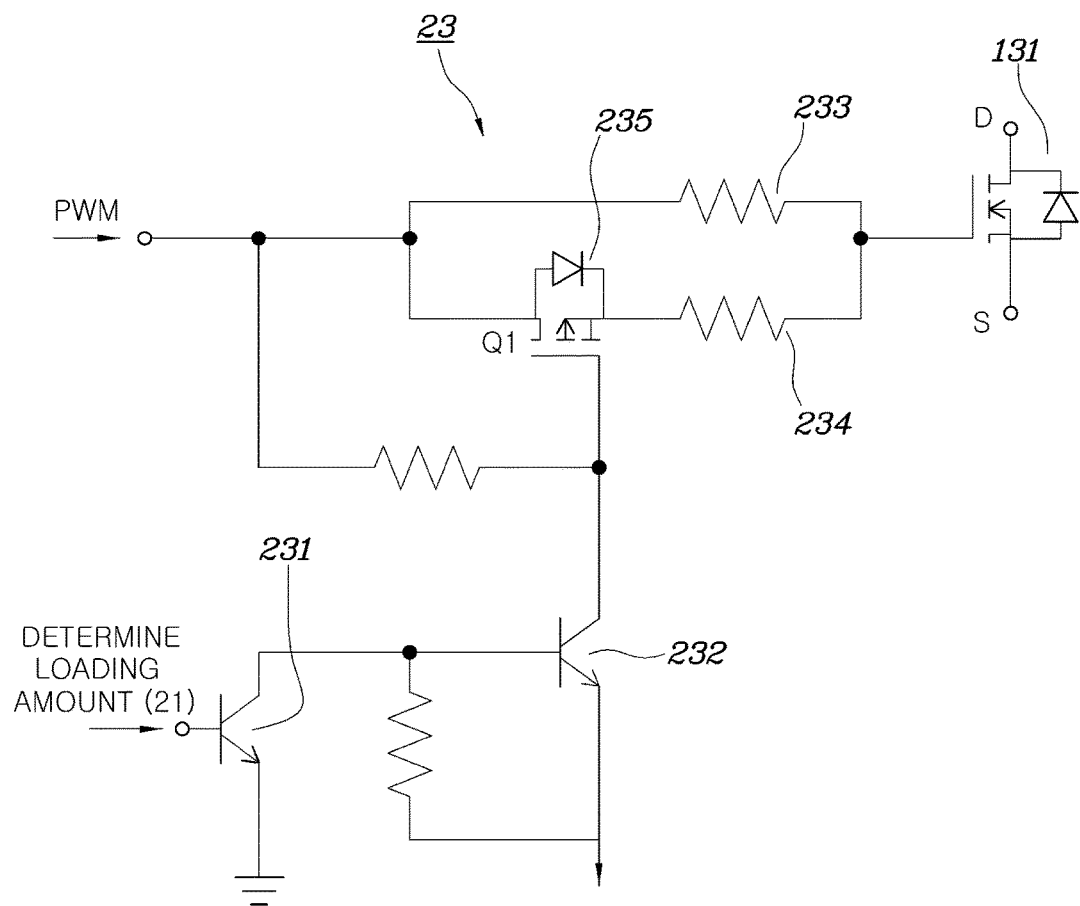
FIG. 4 is a detailed circuit diagram of a gate resistance setting unit of an efficiency determiner of a converter controlling apparatus.

FIG. 4 is a detailed circuit diagram of the gate resistance setting unit 23 of an efficiency determiner of a converter controlling apparatus in some forms of the present disclosure.

As illustrated in FIG. 4, the gate resistance setting unit 23 included in the efficiency determiner 20 of the converter controlling apparatus in some forms of the present disclosure may include a first resistor 233 with an end connected to a gate terminal of a switching device 131 in the LDC 13, and a second resistor 234 and a switch 235 that are connected in series. Here, the series connection structure between the second resistor 234 and the switch 235 may be connected in parallel to the first resistor 233 and a PWM signal for PWM control of the switching device 131 may be input to the other end of the first resistor 233. The switch 235 may be configured to be in short and open states according to the determination result of the heavy load and the light load of the load amount determiner 21.

That is, in the case of a light load state in which the comparator 217 of the load amount determiner 21 with the aforementioned circuit configuration outputs High, the switch 235 of the gate resistance setting unit 23 may be turned on and a total resistance value, i.e., a small resistance value according to the parallel connection between the first resistor 233 and the second resistor 234 may be applied to a gate terminal of the switching device 131. On other hand, in the case of a heavy load state in which the comparator 217 outputs Low, the switch 235 of the gate resistance setting unit 23 may be turned off and a resistance value, i.e., a large resistance value according to the first resistor 233 may be applied to the gate terminal of the switching device 131.

As such, the gate resistance setting unit 23 may variably control amplitude of a resistance value applied to the gate terminal of the switching device 131 according to light load/heavy load states of the LDC 13. According to an operation of the gate resistance setting unit 23, when an amount of load of the LDC 13 corresponds to a light load, resistance of the gate terminal may be reduced and turn-on speed of the switching device may be increased so as to enhance efficiency of the LDC 13 in the case of light load and, when the amount of load of the LDC 13 corresponds to a heavy load, resistance of the gate terminal of the switching device in the LDC 13 may be increased and voltage stress of the switching device may be reduced so as to inhibit the switching device from being damaged and to enable a stable operation.

For the aforementioned operation of the gate resistance setting unit 23, the gate resistance setting unit 23 may be configured in such a way that the switch 235 is embodied as a p-MOSFET and a drain and a source of the p-MOSFET are connected to the first resistor 233 and the second resistor 234, respectively, and may include a transistor 232 that includes a collector connected to a gate of the p-MOSFET and an emitter to which a negative voltage value (e.g., a negative voltage with the same amplitude as a power voltage) is applied, and a transistor 231 that includes a collector connected to a base of the transistor 232, an emitter that is grounded, and a base to which output of the load amount determiner 21 is applied.

According to this configuration, when the LDC 13 is in a light load mode, a high signal may be applied to the base of the transistor 231 to turn on the transistor 231 and the transistor 232 may be turn on according to turn-on of the transistor 231. A negative voltage may be applied to the gate of the p-MOSFET as the switch 235 to turn on the switch 235 and parallel synthetic resistance of the first resistor 233 and the second resistor 234 may be applied to the gate terminal of the switching device 131 and, thus, the resistance of the gate terminal of the switching device 131 may be reduced compared with the case in which only resistance of the first resistor 233 is applied to the gate terminal. In particular, as the resistance of the gate terminal of the switching device 131 is reduced, turn-on speed of the switching device 131 may be increased and, as a negative voltage is applied to the gate terminal when the switching device 131 is turned off, turn-off speed may also be increased. Accordingly, both turn-on and turn-off speeds of the switching device 131 may be increased and, accordingly, a switching frequency may be reduced and converter efficiency, in particular, efficiency in a light load may remarkably enhance efficiency.

When the LDC 13 is in a heavy load mode, a low signal may be applied to the base of the transistor 231 and the transistor 232 may be turned off according to turn-off of the transistor 231. Accordingly, the p-MOSFET as the switch 235 may also be turned off and only a resistance value according to the first resistor 233 may be applied to the gate terminal of the switching device 131 and, accordingly, the resistance of the gate terminal of the switching device 131 may be increased compared with the case in which parallel synthetic resistance of the first resistor 233 and the second resistor 234 is applied. Accordingly, on/off speed of the switching device 131 is reduced but voltage stress may be lowered to reduce ripple and to stabilize a switching voltage.

Figure 5:
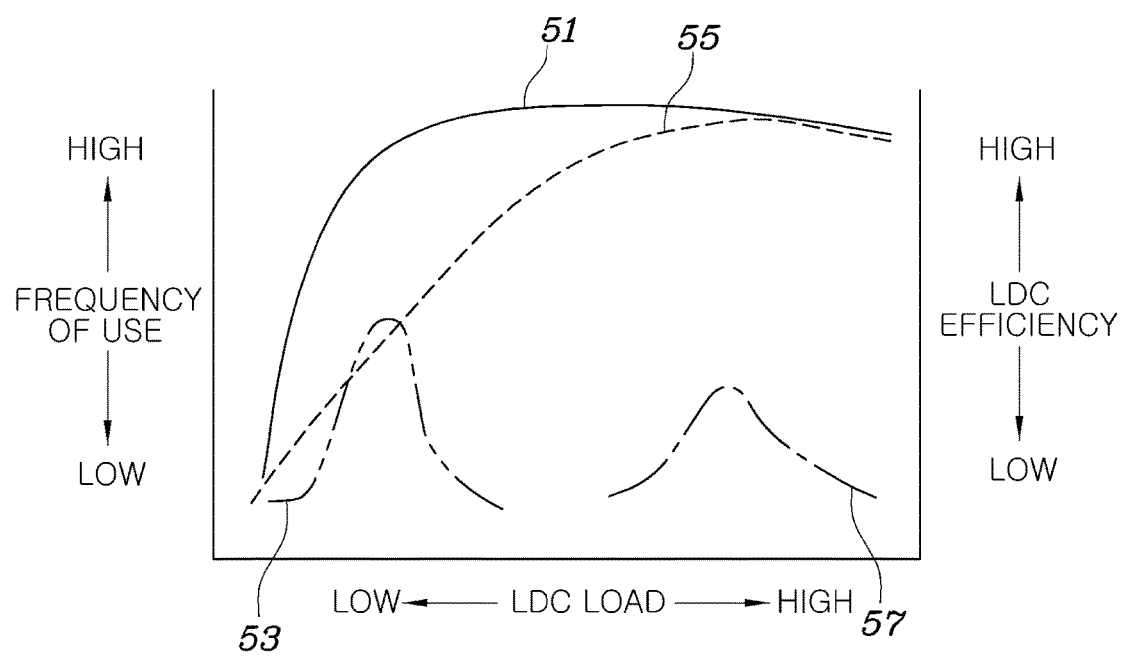
FIGS. 5 and 6 are graphs for explanation of an operation of a converter controlling apparatus.

FIG. 5 is a graph for explanation of an operation of a converter controlling apparatus in some forms of the present disclosure.

As illustrated in FIG. 5 in various forms of the present disclosure, in the case of a small amount of current flowing through the LDC 13, i.e., in a light load state (53), the resistance of the gate terminal of the switching device included in the LDC 13 may be reduced to rapidly turn the switching device on/off and, thus, the converter controlling apparatus may be operated according to a curve 51 with high efficiency in a light load state as switching loss is reduced. On the other hand, in the case of a large amount of current flowing through the LDC 13, i.e., in a heavy load state (57), the resistance of the gate terminal of the switching device included in the LDC 13 may be increased and, thus, efficiency of the switching device is slightly reduced as turn on/off speeds of the switching device are reduced (55) but, instead, the switching device may be prevented from being damaged through voltage stabilization of reducing output ripple and increasing opposite voltages (drain-source voltage) of the switching device.

According to some forms of the present disclosure, the resistance of the gate terminal of the switching device in the LDC 13, set by the gate resistance setting unit 23, may be arbitrarily controlled irrespective of an amount of load of the LDC 13 to enhance electromagnetic interference (EMI) performance. That is, when the controller 30 inputs a control signal with repetitive High/Low at a predetermined period to the base of the transistor 231 of the gate resistance setting unit 23, the transistors 231 and 232 and the switch 235 may be repeatedly turned on/off at the period and, accordingly, the resistance of the gate terminal of the switching device in the LDC 13 may be repeatedly changed to a large or small value at a period.

Figure 6:
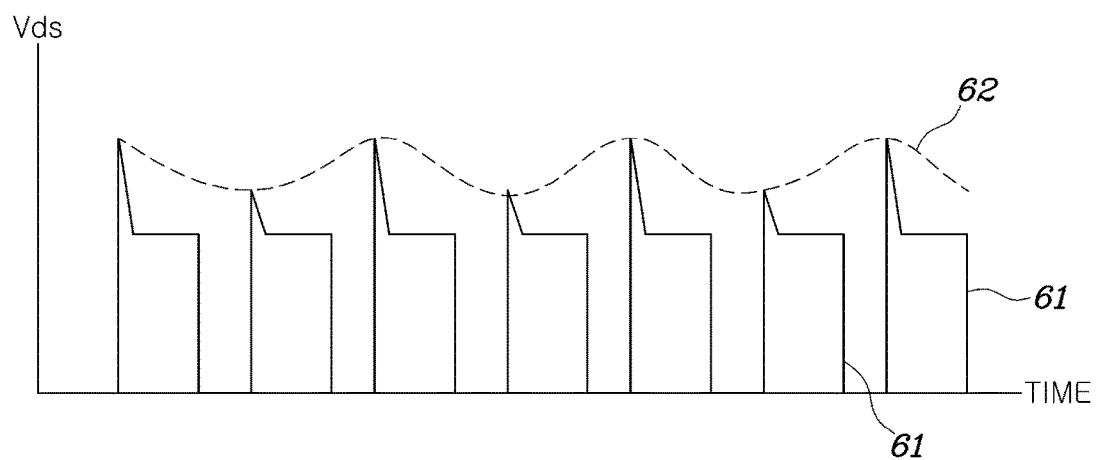

As the resistance of the gate terminal of the switching device in the LDC 13 is repeatedly changed, turn on/off speeds of the switching device may be repeatedly changed to large or small speed and a peak value of opposite voltages (drain-source voltage) of the switching device may be repeatedly changed, as illustrated in FIG. 6. That is, an average value of EMI via switching of the switching device may be reduced, thereby enhancing EMI performance of the LDC 13.

As is apparent from the above description, the resistance of the gate terminal of the switching device included in the converter may be varied according to a load state of a converter. Accordingly, resistance of the gate terminal may be reduced in the case of a light load to enhance efficiency and the resistance of the gate terminal may be increased in the case of a heavy load to achieve voltage stabilization.

In particular, when a converter is in a light load state, the resistance of the gate terminal of the switching device included in the converter may be reduced to rapidly turn on/off the switching device and, thus, the converter controlling apparatus may be operated according to a curve with high efficiency in a light load state as switching loss is reduced. On the other hand, when the converter is in a heavy load state, the resistance of the gate terminal of the switching device included in the converter may be increased and, thus, efficiency of the switching device is slightly reduced as turn on/off speeds of the switching device are reduced. However, the switching device may be inhibited from being damaged through voltage stabilization of reducing output ripple and increasing opposite voltages (drain-source voltage) of the switching device.

In addition, the resistance of the gate terminal of the switching device in the converter may be repeatedly changed to a large or small value at a period under control of a controller. Accordingly, turn on/off speeds of the switching device may be repeatedly changed to large or small speed and a peak value of opposite voltages (drain-source voltage) of the switching device may be repeatedly changed so as to reduce an average value of EMI of the converter.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A converter controlling apparatus including a plurality of switching devices capable of controlling a pulse width modulation (PWM), the converter controlling apparatus comprising:
an efficiency determiner configured to variably change a resistance of a gate terminal, wherein a PWM signal for controlling a PWM of the plurality of switching devices is applied to a gate terminal based on an amount of current flowing through the converter, wherein the efficiency determiner comprises:
a load amount determiner configured to:
detect the amount of the current flowing through the converter;
compare the amount of the current flowing through the converter with a preset reference value; and
determine whether an amount of load of the converter is a heavy load or a light load; and
a gate resistance setting unit configured to:
when the amount of the load of the converter determined by the load amount determiner is the heavy load, increase resistance of the gate terminal; and
when the amount of the load of the converter determined by the load amount determiner is the light load, reduce the resistance of the gate terminal.

2. The converter controlling apparatus according to claim 1, wherein the load amount determiner comprises:
a current transformer configured to output current corresponding to the amount of the current flowing through the converter;
resistors configured to generate a detection voltage corresponding to an amount of the current outputted by the current transformer; and
a comparator configured to output a comparison result between the detection voltage and the preset reference voltage.

3. The converter controlling apparatus according to claim 1, wherein the gate resistance setting unit comprises:
a first resistor, wherein one end of the first resistor is connected to the gate terminal and the PWM signal is inputted to the other end of the first resistor;
a second resistor; and
a switch connected in series to the second resister,
wherein a series connection between the second resistor and the switch is connected in parallel to the first resistor and the switch is determined as short-circuited or opened based on whether the amount of the load of the converter determined by the load amount determiner is the heavy load or the light load.

4. The converter controlling apparatus according to claim 3, wherein:
when the amount of the load of the converter determined by the load amount determiner is the heavy load, the switch is opened; and
when the amount of the load of the converter determined by the load amount determiner is the light load, the switch is short-circuited.

5. The converter controlling apparatus according to claim 4, wherein:
the switch is a p-MOSFET, wherein a drain and a source of the p-MOSFET are connected to the first resistor and the second resistor, respectively; and
the gate resistance setting unit further comprises:
a first transistor comprising:
a collector connected to a gate of the p-MOSFET; and
an emitter, wherein a negative voltage value is applied to the emitter; and
a second transistor comprising:
a collector connected to a base of the first transistor;
an emitter that is grounded; and
a base, wherein the amount of the load of the converter determined by the load amount determiner is applied to the base.

6. The converter controlling apparatus according to claim 1, further comprising:
a controller configured to control the efficiency determiner to repeatedly change the resistance of the gate terminal at a predetermined period irrespective of the amount of the current flowing through the converter.

7. The converter controlling apparatus according to claim 3, further comprising:
a controller configured to control the switch, wherein the switch is repeatedly short-circuited or opened at a predetermined period irrespective of the amount of the current flowing through the converter.

8. A converter controlling apparatus including a plurality of switching devices, wherein a pulse width modulation (PWM) signal for controlling a PWM of the plurality of switching devices is applied to a gate terminal, the converter controlling apparatus comprising:
a load amount determiner comprising:
a current transformer configured to output current corresponding to an amount of current flowing through the converter;
a resistor configured to generate a detection voltage corresponding to an amount of the current outputted by the current transformer; and
a comparator configured to output a comparison result between the detection voltage and a preset reference voltage; and
a gate resistance setting unit comprising:
a first resistor, wherein one end of the first resistor is connected to the gate terminal and the PWM signal is inputted to the other end of the first resistor;
a second resistor; and
a switch connected in series to the second resister,
wherein a series connection between the second resistor and the switch is connected in parallel to the first resistor and the switch is determined as short-circuited or opened based on the comparison result by the comparator.

9. The converter controlling apparatus according to claim 8, wherein:
when the detection voltage is greater than the reference value, the comparator is configured to output a first determination signal, and when the detection voltage is less than the reference value, the comparator is configured to output a second determination signal; and
when the comparator outputs the first determination signal, the switch is opened, and when the comparator outputs the second determination signal, the switch is short-circuited.

10. The converter controlling apparatus according to claim 9, wherein:
the switch is a p-MOSFET, wherein a drain and a source of the p-MOSFET are connected to the first resistor and the second resistor, respectively; and
the gate resistance setting unit further comprises:
a first transistor comprising:
a collector connected to a gate of the p-MOSFET; and
an emitter, wherein a negative voltage value is applied to the emitter; and
a second transistor comprising:
a collector connected to a base of the first transistor;

an emitter that is grounded; and a base, wherein the first determination signal or the second determination signal is applied to the base.

11. A converter controlling apparatus including a plurality of switching devices, wherein a pulse width modulation (PWM) signal for controlling a PWM of the plurality of switching devices is applied to a gate terminal, the converter controlling apparatus comprising:

a gate resistance setting unit comprises:

a first resistor, wherein one end of the first resistor is connected to the gate terminal and the PWM signal is inputted to the other end of the first resistor;

a second resistor; and a switch connected in series to the second resister, wherein a series connection between the second resistor and the switch is connected in parallel to the first resistor; and a controller configured to control the switch, wherein the switch is repeatedly short-circuited or opened at a predetermined period.

12. The converter controlling apparatus according to claim 11, wherein:

the switch is a p-MOSFET, wherein a drain and a source of the p-MOSFET are connected to the first resistor and the second resistor, respectively; and the gate resistance setting unit further comprises:

a first transistor comprising:

a collector connected to a gate of the p-MOSFET; and an emitter, wherein a negative voltage value is applied to the emitter; and a second transistor comprising:

a collector connected to a base of the first transistor;

an emitter that is grounded; and a base, wherein a control signal of the controller is inputted to the base.

\* \* \* \* \*